US008929294B2

(12) United States Patent
Devarasetty et al.

(10) Patent No.: US 8,929,294 B2
(45) Date of Patent: Jan. 6, 2015

(54) METHODS, SYSTEMS, AND COMPUTER READABLE MEDIA FOR RAPID DECODING OF WIRELESS COMMUNICATIONS NETWORK UPLINK DATA

(71) Applicant: Ixia, Calabasas, CA (US)

(72) Inventors: Prasada Rao Devarasetty, Cary, NC (US); Madhu H. Rangappagowda, Cary, NC (US)

(73) Assignee: Ixia, Calabasas, CA (US)

( * ) Notice: Subject to any disclaimer, the term of this patent is extended or adjusted under 35 U.S.C. 154(b) by 197 days.

(21) Appl. No.: 13/682,663

(22) Filed: Nov. 20, 2012

(65) Prior Publication Data
US 2014/0140271 A1 May 22, 2014

(51) Int. Cl.
H04W 4/00 (2009.01)

(52) U.S. Cl.
CPC ..................................... H04W 4/00 (2013.01)
USPC .......................................................... 370/328

(58) Field of Classification Search
CPC .................................................... H04W 24/06
See application file for complete search history.

(56) References Cited

U.S. PATENT DOCUMENTS

| 2007/0116046 A1 | 5/2007 | Liu et al. |
| 2009/0083234 A1 | 3/2009 | Yeom et al. |
| 2009/0196244 A1 | 8/2009 | Chun et al. |
| 2010/0165847 A1 | 7/2010 | Kamuf et al. |
| 2010/0291940 A1 | 11/2010 | Koo et al. |
| 2010/0303011 A1 | 12/2010 | Pan et al. |
| 2010/0331030 A1 | 12/2010 | Nory et al. |
| 2011/0076962 A1 | 3/2011 | Chen et al. |
| 2011/0110315 A1 | 5/2011 | Chen et al. |
| 2012/0094651 A1 | 4/2012 | Chun et al. |
| 2013/0010724 A1 | 1/2013 | Han et al. |
| 2013/0034062 A1 | 2/2013 | Seo et al. |
| 2013/0058240 A1 | 3/2013 | Kim et al. |
| 2013/0058294 A1 | 3/2013 | Miki et al. |
| 2013/0058306 A1 | 3/2013 | Noh et al. |
| 2013/0070689 A1 | 3/2013 | Liu et al. |
| 2013/0070690 A1 | 3/2013 | Moon et al. |
| 2013/0088973 A1 | 4/2013 | Yang et al. |
| 2013/0121168 A1 | 5/2013 | Luo et al. |
| 2013/0121295 A1 | 5/2013 | Saito et al. |
| 2013/0155872 A1 | 6/2013 | Subramanian et al. |
| 2014/0119213 A1 | 5/2014 | Devarasetty |

OTHER PUBLICATIONS

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).
Non-Final Office Action for U.S. Appl. No. 13/668,203 (Apr. 29, 2014).
Final Office Action for U.S. Appl. No. 13/336,005 (Feb. 26, 2014).

(Continued)

Primary Examiner — Huy D Vu
Assistant Examiner — Teisha D Hall
(74) Attorney, Agent, or Firm — Jenkins, Wilson, Taylor & Hunt, P.A.

(57) ABSTRACT

Methods, systems, and computer readable media for rapid decoding of wireless communications network uplink data are disclosed. According to one method, the wireless communications network data analyzer receives downlink data generated by a wireless access node. The wireless communications network data analyzer extracts uplink data decode keys from the downlink data. The wireless communications network data analyzer stores the uplink data decode keys. The wireless communications data analyzer captures uplink data and decodes the uplink data using the stored uplink data decode keys.

19 Claims, 4 Drawing Sheets

(56) References Cited

OTHER PUBLICATIONS

Non-Final Office Action for U.S. Appl. No. 13/336,005 (Jul. 2, 2013).
Notification Concerning Availability of the Publication of the International Application for PCT International Application No. PCT/US2012/070877 (Jun. 27, 2013).
Notification of Transmittal of the International Search Report and the Written Opinion of the International Searching Authority, or the Declaration for the International Application No. PCT/US2012/070877 (Mar. 28, 2013).
Commonly assigned, co-pending U.S. Appl. No. 13/668,203 for "Methods, Systems, and Computer Readable Media for Automatically Decoding Uplink Data," (unpublished, filed Nov. 2, 2012).
"3rd Generation Partnership Project; Technical Specification Group Radio Access Network; Evolved Universal Terrestrial Radio Access (E-UTRA); Multiplexing and channel coding (Release 11)," 3GPP TS 36.212, V11.0.0 (Sep. 2012).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0 (Jun. 2012).
Isanjole, "WaveJudge 4900A LTE Analyzer," Isanjole, pp. 1-2 (Feb. 2012).
Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Data," (unpublished, filed Dec. 23, 2011).
"PDCCH Blind Decoding," PDCCH Decoding Example, http://www.steepestascent.com, pp. 1-6 (Copyright 2009-2011, dowloaded from the Internet Dec. 4, 2011).
"3rd Generation Partnership Project; Technical Specification Group Radio Access Network; Evolved Universal Terrestrial Radio Access (E-UTRA); Physical layer procedures (Release 10)," 3GPP TS 36.213, V10.3.0, pp. 1-122 (Sep. 2011).
"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0, pp. 1-79 (Sep. 2011).
"3rd Generation Partnership Project; Technical Specification Group Radio Access Network; Evolved Universal Terrestrial Radio Access (E-UTRA); Physical Channes and Modulation (Release 10)," 3GPP TS 36.211, V10.3.0, pp. 1-103 (Sep. 2011).

FIG. 4

METHODS, SYSTEMS, AND COMPUTER READABLE MEDIA FOR RAPID DECODING OF WIRELESS COMMUNICATIONS NETWORK UPLINK DATA

TECHNICAL FIELD

The subject matter described herein relates to decoding of wireless communications network uplink data. More particularly, the subject matter described herein relates to methods, systems, and computer readable media for rapid decoding of wireless communications network uplink data.

BACKGROUND

In testing wireless communications network equipment, it is often desirable to decode uplink data for debugging and other analysis purposes. In long term evolution (LTE) wireless communications networks, uplink data refers to data transmitted from the user equipment (UE) to the eNode B. Downlink data refers to data transmitted from the eNode B to the UE. When an eNode B transmits downlink data to the UE, the UE decodes the downlink data and uses the decoded control data to form uplink data that is transmitted to the eNode B. When testing wireless communications network equipment, such as an eNode B, a device referred to as a multi-UE simulator can be used to simulate multiple UEs and to transmit uplink data to the eNode B. The simulator receives downlink data from the eNode B, processes the downlink data, forms uplink data, and transmits the uplink data to the eNode B.

In order to debug the uplink data, it is necessary to decode the uplink data. For example, if an application engineer testing an eNode B with a multi-UE simulator determines that uplink data is not decoding correctly, the problem could reside with the eNode B, the multi-UE simulator, or both. In order to debug the problem for the uplink data, the downlink data must first be decoded, and the uplink data must then be decoded from the downlink data. To decode the uplink and downlink data, the application engineer may transmit a file containing megabytes or even gigabytes containing uplink and downlink data to a lab for testing. The lab may decode the downlink data in the file and use the downlink data to decode the uplink data. The process of decoding the downlink data each time the uplink data is required to be analyzed is time consuming. This scenario gets even worse if the user wants to keep re-analyzing the uplink data for multiple times. Further, storing a complete set of downlink data simply for the purpose of uplink data decoding increases the memory requirements of uplink data analysis systems.

Accordingly, in light of these difficulties, there exists a need for methods, systems, and computer readable media for rapid decoding of wireless communications network uplink data.

SUMMARY

Methods, systems, and computer readable media for rapid decoding of wireless communications network uplink data are disclosed. According to one method, the wireless communications network data analyzer receives downlink data generated by a wireless access node. The wireless communications network data analyzer extracts uplink data decode keys from the downlink data. The wireless communications network data analyzer stores the uplink data decode keys. The wireless communications data analyzer captures uplink data and decodes the uplink data using the stored uplink data decode keys.

The subject matter described herein for rapid decoding of wireless communications network uplink data may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is a screen shot illustrating an exemplary graphical user interface for decoding wireless communications network uplink data using decode keys according to an embodiment of the subject matter described herein.

DETAILED DESCRIPTION

Figure 1:
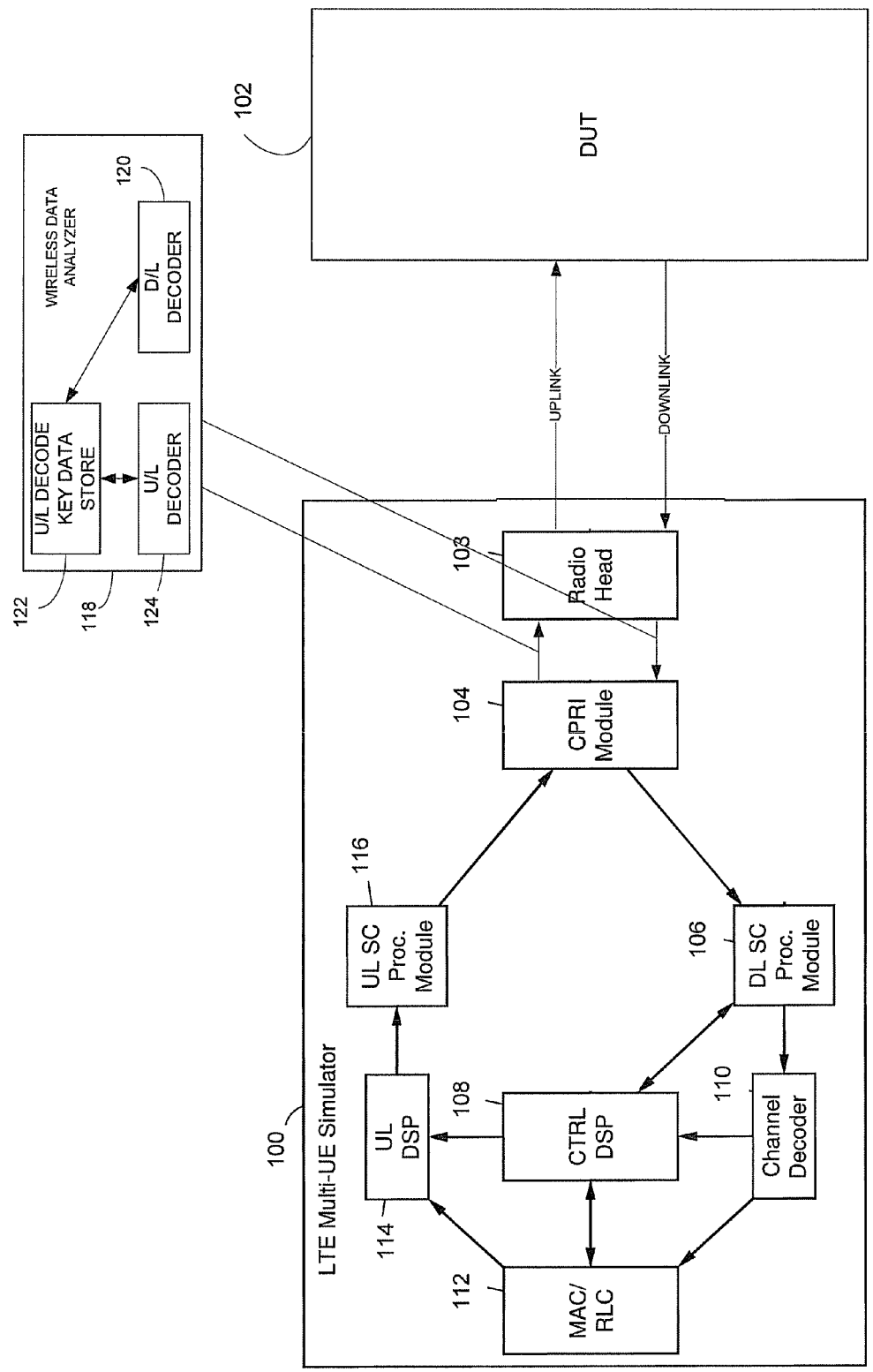
FIG. 1 is a block diagram of an LTE multi-UE simulator with an external wireless communications network data analyzer and a device under test according to an embodiment of the subject matter described herein.

Methods, systems, and computer readable media for rapid decoding of wireless communications network uplink data are disclosed. FIG. 1 is a block diagram illustrating an exemplary LTE multi-UE simulator with an external wireless communications network data analyzer capable of rapidly decoding wireless communications network uplink data according to an embodiment of the subject matter described herein. Referring to FIG. 1, simulator 100 includes various components for simulating UEs and testing device under test 102, which may be a wireless access node, such as an eNode B, a base transceiver station (BTS), a wireless access point, or a combination thereof. In the illustrated example, these components include a radio head 103 that transmits uplink data to and receives downlink data from device under test 102. A common public radio interface (CPRI) 104 receives data in the downlink direction for further processing and sends data in the uplink direction to radio head 103. A downlink signal chain processing module 106 processes downlink data and forwards control data to control DSP 108. A channel decoder 110 decodes downlink data using a specified algorithm, such as turbo decoding. A medium access control/radio link control (MAC/RLC) module 112 performs MAC and radio link control layer processing of received data. Control DSP 108 formulates uplink data and forwards that data to uplink DSP 114. Uplink signal chain processing module 116 performs UE-specific processing to form uplink resource blocks and sends the blocks to CPRI 104 for transmission to the radio head. A wireless communications data analyzer 118 includes a downlink data decoder 120 that decodes downlink data sufficiently to extract uplink data decode keys. The uplink data decode keys are stored in uplink data decode key data store 122. An uplink data decoder 124 decodes uplink data using the stored keys, rather than requiring that the downlink data be re-decoded in order to extract the necessary parameters to decode the uplink data.

The following comma separated list of parameters is an example of an uplink data decode key that may be stored for a single UE in a single subframe of uplink data:

20(UE_Id), 0x03ed2400,6(rb_len), 2(rb_start), 2152(block_size), 18(mcs_index), 16QAM, 0(hopping on/off), 2(TPC), 0(NDI), 0(cyclic_shift), 0(cqi_request), 0(ul_index_DAI – for tdd only)

In the parameter listed above, the first parameter that is stored as part of the decode key is the UE identifier, which for LTE networks is referred to as the radio network terminal identifier (RNTI). The second parameter is the resource block length. The third parameter is the resource block start. The fourth parameter is the block size. The fifth parameter is the modulation coding scheme (MCS) index. The sixth parameter is the type of quadrature amplitude modulation (QAM). The seventh parameter is the hopping on or hopping off parameter. The eighth parameter is transmit power control (TPC). The ninth parameter is the new data indicator (NDI). The tenth parameter is the cyclic shift. The eleventh parameter is the call quality indicator (CQI) request. The twelfth parameter is the uplink (UL) index which is valid for time division duplexing (TDD) only. Downlink data decoder 120 may store this information on a per UE, per subframe basis. In other words, a single decode key may be stored for each UE and each subframe. The following is an example of data that may be stored for a single subframe in which ten UEs transmit:

SUBFRAME_NUM = 0

1. 1178,0x00137400,1,9,488,23,64QAM,0,2,0,0,0,0,
2. 1193,0x25157400,48,46,24496,23,64QAM,0,2,0,0,0,0,
3. 1172,0x040f6400,6,19,2792,22,64QAM,0,2,0,0,0,0,
4. 1187,0x06557400,9,10,4584,23,64QAM,0,2,0,0,0,0,
5. 1202,0x02635420,4,5,1736,21,64QAM,0,2,0,0,1,0,
6. 1169,0x01216420,2,44,904,22,64QAM,0,2,0,0,1,0,
7. 1184,0x01077420,2,31,1000,23,64QAM,0,2,0,0,1,0,
8. 1199,0x041b5420,6,25,2600,21,64QAM,0,2,0,0,1,0,
9. 1166,0x042b7400,6,33,2984,23,64QAM,0,2,0,0,0,0,
10. 1196,0x036f7420,5,39,2472,23,64QAM,0,2,0,0,1,0, !.

Each of lines 1-10 in the passage above represents UE-specific decode keys obtained from subframe 0 of the downlink data. The decode keys above may be stored in a file along with similar decode keys for other subframes. Such keys may be used to rapidly and repeatedly decode uplink data, rather than requiring that a full decode of downlink data to be performed each time that it is necessary to decode uplink data.

Figure 2:
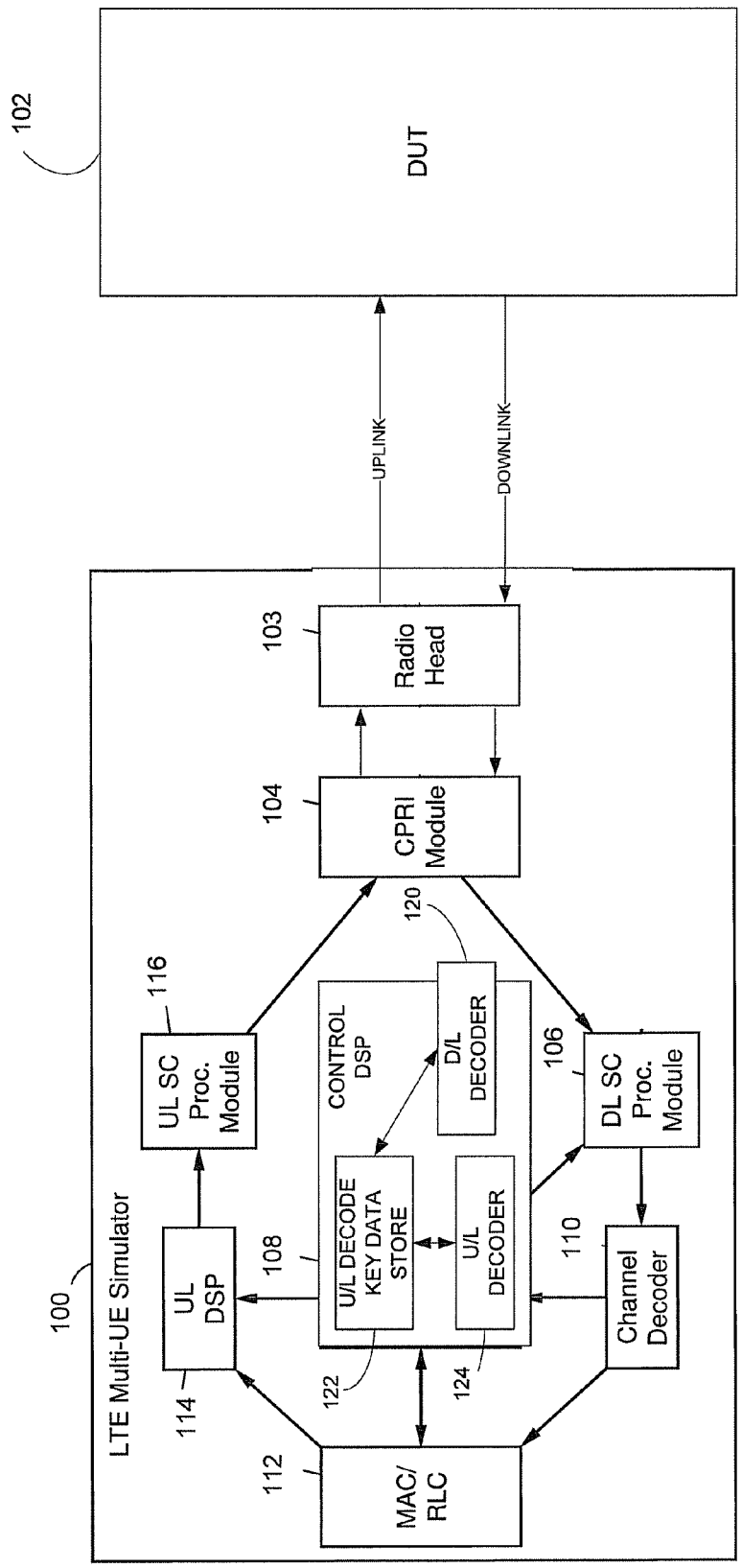
FIG. 2 is a block diagram of an LTE multi-UE simulator with an internal wireless communications network data analyzer according to an embodiment of the subject matter described herein.

FIG. 2 is a block diagram illustrating an alternate embodiment of the subject matter described herein. In FIG. 2, rather than using an external data analyzer to analyze and decode uplink data the functionality of analyzer 118 is incorporated within DSP 108. Other than that, the functionality is the same as illustrated in FIG. 1, and a description thereof will not be repeated herein. Thus, in one embodiment of the subject matter described herein, wireless data analyser, including downlink data decoder 120, uplink decoder 124, and uplink decode key data store 122 are components of LTE multi-UE simulator 100.

Figure 3:
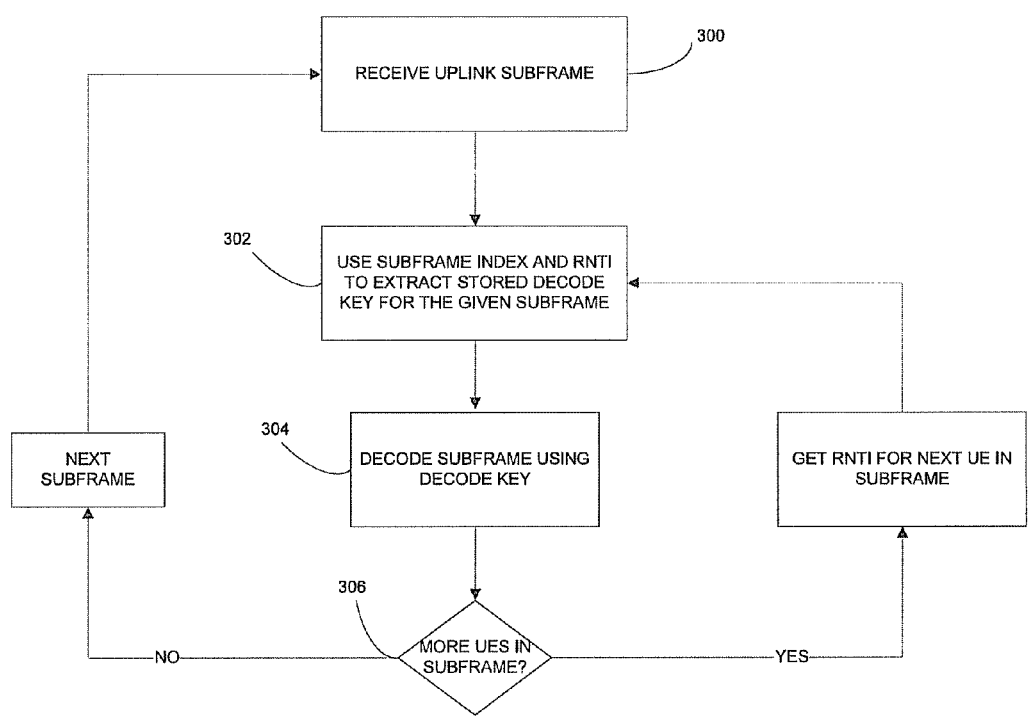
FIG. 3 is a flow chart illustrating exemplary steps for rapid decoding of wireless communications network uplink data according to an embodiment of the subject matter described herein.
Figure 4:
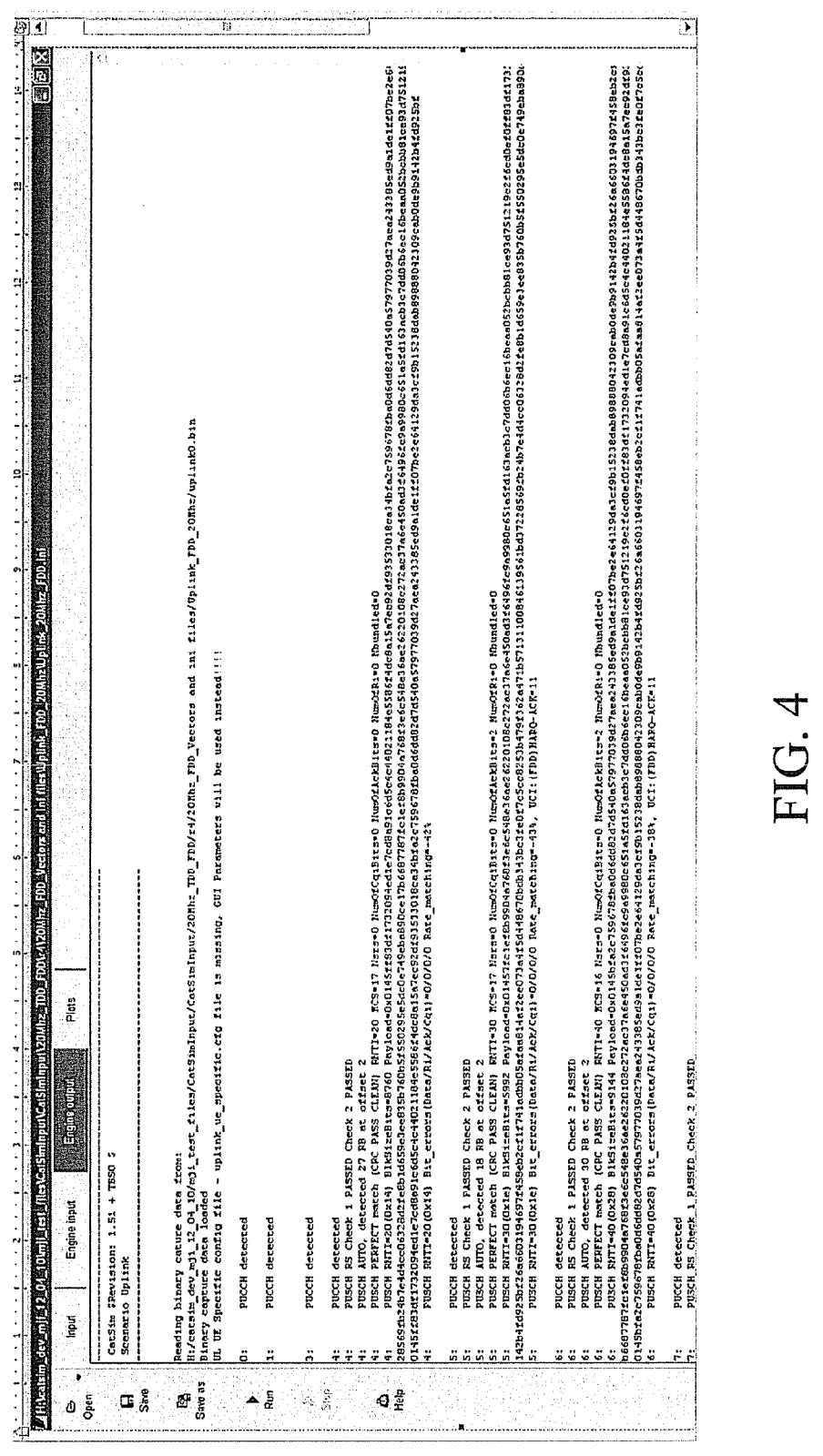

FIG. 3 is a flow chart illustrating exemplary steps for rapid decoding of uplink according to an embodiment of the subject matter described herein. Referring to FIG. 3, in step 300, an uplink subframe is received. For example, uplink data decoder 124 may receive uplink data copied from the uplink side of common public radio interface (CPRI) 104. In step 302, the time slot and radio network terminal identifier (RNTI) are used to extract the stored decode key for the subframe. For example, uplink data decoder 124 may use as an index the RNTI and time stamp to extract a decode key for a particular UE in a particular subframe. In step 304, the subframe is decoded using the decode key. For example, uplink data decoder 124 may decode the data using the stored decode keys for each UE whose data is present in the subframe. FIG. 4 is a computer screen shot illustrating exemplary decoded uplink data that is decoded using stored decode keys according to an embodiment of the subject matter described herein. Such decoding may be performed repeatedly without requiring corresponding decoding of downlink data.

In step 306, it is determined if there are more UEs in the subframe. If there are more UEs in the subframe, the RNTI for the next UE is determined and control returns to step 302. If there are no more UEs in the subframe, control returns to step 300 where the next subframe is processed.

FIG. 4 is a computer screen shot of an example graphical user interface that may be generated by wireless network data analyzer 118 according to an embodiment of the subject matter described herein. In FIG. 4, decoded uplink data are presented without decoding any downlink data but using already stored decoded keys. In the illustrated example, the uplink data channel from which the UE specific data is decoded is the physical uplink shared channel (PUSCH). Exemplary uplink data parameters that are decoded from the PUSCH include the RNTI, the block size, the payload, the channel quality indicator, etc. The interface also indicates the presence or absence of bit errors in the various parameters, which may be useful for debugging purposes. It should be noted that uplink data analyser 118 can now implement "decode uplink data only" function, using the stored uplink data decode keys. Because the uplink data decode keys are stored and available for us in decoding uplink data, the parameters can be repeatedly used without requiring repeated decoding of downlink data.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for rapid decoding of wireless communications network uplink data, the method comprising:
   in a wireless communications network data analyzer that is distinct from a wireless access node:
      capturing downlink data generated by the wireless access node;
      extracting uplink data decode keys from the captured downlink data;
      storing the uplink data decode keys;
      capturing uplink data generated by at least one user equipment (UE) or simulated UE;

and decoding the uplink data using the stored uplink decode keys.

2. The method of claim 1 wherein the wireless communications network data analyzer is a component of a long term evolution (LTE) multi-UE simulator.

3. The method of claim 1 wherein the wireless communications network data analyzer comprises a standalone computing platform.

4. The method of claim 1 wherein capturing the downlink data includes capturing the downlink data from a common public radio interface (CPRI).

5. The method of claim 1 wherein extracting uplink data decode keys includes extracting per UE, per subframe decode keys from the downlink data.

6. The method of claim 5 wherein extracting per UE, per subframe decode keys includes extracting a plurality of per UE decode keys per subframe.

7. The method of claim 5 wherein extracting the per UE, per subframe decode keys includes extracting a UE identifier suitable for identifying UE specific data in an uplink time slot.

8. The method of claim 1 wherein storing the uplink data decode keys includes storing the uplink data decode keys in memory associated with the wireless communications network data analyzer.

9. The method of claim 1 wherein decoding the uplink data includes decoding the uplink data using the stored decode keys rather than repeating decoding of the corresponding downlink data.

10. A system for rapid decoding of wireless communications network uplink data, the system comprising:
a wireless communications network data analyzer that is distinct from a wireless access node, the wireless communications data network analyzer comprising:
a downlink data decoder for capturing downlink data generated by the wireless access node, extracting uplink data decode keys from the downlink data;
an uplink data decode key data store for storing the uplink data decode keys decoded by the downlink data decoder; and
uplink data decoder configured to capture uplink data and decode the uplink data using the stored keys.

11. The system of claim 10 wherein the wireless communications network data analyzer is a component of a long term evolution (LTE) multi-UE simulator.

12. The system of claim 10 wherein the wireless communications network data analyzer is a standalone computing platform.

13. The system of claim 10 wherein capturing the downlink data includes capturing the downlink data from a common public radio interface (CPRI).

14. The system of claim 10 wherein extracting uplink data decode keys includes extracting per UE, per subframe decode keys from the downlink data.

15. The system of claim 14 wherein extracting per UE per subframe decode keys includes extracting a plurality of per UE decode keys per subframe.

16. The system of claim 14 wherein extracting the per UE, per subframe decode keys includes extracting a UE identifier suitable for identifying UE specific data in an uplink time slot.

17. The system of claim 10 wherein storing the uplink data decode keys includes storing the uplink data decode keys in memory associated with the wireless communications network data analyzer.

18. The system of claim 10 wherein decoding the uplink data includes decoding the uplink data using the stored decode keys rather than repeating decoding of the corresponding downlink data.

19. A non-transitory computer readable medium having stored thereon executable instructions that when executed by the processor of a computer control the computer to perform steps comprising:
in a wireless communications network data analyzer that is distinct from a wireless access node:
capturing downlink data generated by the wireless access node;
extracting uplink data decode keys from the captured downlink data;
storing the uplink data decode keys;
capturing uplink data generated by at least one user equipment (UE) or simulated UE; and
decoding the uplink data using the stored uplink decode keys.

* * * * *